US011972730B2

(12) United States Patent
Lee et al.

(10) Patent No.: US 11,972,730 B2
(45) Date of Patent: Apr. 30, 2024

(54) DISPLAY DEVICE

(71) Applicant: Samsung Display Co., Ltd., Yongin-si (KR)

(72) Inventors: Donggyu Lee, Yongin-si (KR); Jin-Wook Yang, Yongin-si (KR); Jae-Hyeon Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/126,650

(22) Filed: Mar. 27, 2023

(65) Prior Publication Data

US 2023/0410742 A1 Dec. 21, 2023

(30) Foreign Application Priority Data

Jun. 21, 2022 (KR) ........................ 10-2022-0075260

(51) Int. Cl.
*G09G 5/00* (2006.01)
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/0264* (2013.01); *G09G 2310/08* (2013.01); *G09G 2330/021* (2013.01)

(58) Field of Classification Search
CPC ......... G09G 3/3233; G09G 2300/0819; G09G 2300/0842; G09G 2300/0861; G09G 2310/0264; G09G 2310/08; G09G 2330/021; G09G 3/3266; G09G 5/003; G09G 3/2096
See application file for complete search history.

(56) References Cited

U.S. PATENT DOCUMENTS

| | | | | |
|---|---|---|---|---|
| 2019/0197941 A1* | 6/2019 | Lim | ..................... | G09G 3/2096 |
| 2020/0082781 A1* | 3/2020 | An | ......................... | G09G 5/003 |
| 2021/0280125 A1* | 9/2021 | Kim | ..................... | G09G 3/2096 |
| 2021/0319755 A1* | 10/2021 | Kim | ..................... | G09G 3/3233 |
| 2022/0084472 A1* | 3/2022 | Kim | ..................... | G09G 3/3266 |

FOREIGN PATENT DOCUMENTS

| | | | |
|---|---|---|---|
| KR | 1020140140939 | A | 12/2014 |
| KR | 1020200061657 | A | 6/2020 |
| KR | 1020210113530 | A | 9/2021 |

* cited by examiner

*Primary Examiner* — Abdul-Samad A Adediran
(74) *Attorney, Agent, or Firm* — CANTOR COLBURN LLP

(57) ABSTRACT

A display device includes: a display panel and a panel driver for driving the display panel during a plurality of driving frames whose frequencies are varied. Among the driving frames, a first driving frame having a first frequency includes a first write period, and a second driving frame having a second frequency lower than the first frequency includes a second write period and a variable blank period. The panel driver includes a data driver and a driving controller. Each of the first and second write periods includes N horizontal periods (N is an integer number equal to or greater than 1), each of the N horizontal periods has a first duration, and each of the first and second write periods has a second duration corresponding to N times of the first duration. The driving controller applies a training synchronizing signal to the data driver during the variable blank period.

20 Claims, 10 Drawing Sheets

DISPLAY DEVICE

This application claims priority to Korean Patent Application No. 10-2022-0075260, filed on Jun. 21, 2022, and all the benefits accruing therefrom under 35 U.S.C. § 119, the content of which in its entirety is herein incorporated by reference.

BACKGROUND

1. Field of Disclosure

The present disclosure relates to a display device. More particularly, the present disclosure relates to a display device capable of reducing power consumption.

2. Description of the Related Art

Among display devices, a light emitting type display device displays an image using a light emitting diode that emits a light by a recombination of holes and electrons. The light emitting type display device has advantages such as a fast response speed, a low power consumption, etc.

The light emitting type display device includes pixels connected to data lines and scan lines. The pixels include a light emitting diode and a circuit unit to control an amount of current flowing through the light emitting diode. The circuit unit controls the amount of current flowing to a second driving voltage from a first driving voltage via the light emitting diode in response to a data signal. In this case, a light with a predetermined brightness is generated in response to the amount of current flowing through the light emitting diode.

SUMMARY

The present disclosure provides a display device that supports a stable operation of a data driver operating at a variable frequency mode.

Embodiments of the invention provide a display device including a display panel including a plurality of pixels and a panel driver for driving the display panel during a plurality of driving frames of which frequencies are varied. The plurality of driving frames includes a first driving frame having a first frequency and includes a first write period, and a second driving frame having a second frequency lower than the first frequency and includes a second write period and a variable blank period.

The panel driver includes: a data driver for outputting data signals and a driving controller for controlling a drive of the data driver. Each of the first and second write periods includes N horizontal periods, each of the N horizontal periods has a first duration, and each of the first and second write periods has a second duration corresponding to N times of the first duration (N is an integer number equal to or greater than 1). The driving controller applies a training synchronizing signal to the data driver during the variable blank period.

Embodiments of the invention provide a display device including a display panel including a plurality of pixels and a panel driver for driving the display panel during a plurality of driving frames of which frequencies are varied. The plurality of driving frames includes a first driving frame having a first frequency and includes a first write period in which data signals are written in the pixels, and a second driving frame having a second frequency lower than the first frequency and includes a second write period in which the data signals are written in the pixels and at least one holding period in which the data signals are held.

The panel driver includes a data driver for outputting the data signals and a driving controller for controlling a drive of the data driver. The driving controller applies a training synchronizing signal to the data driver during the at least one holding period.

According to the above, in a case where a blank period corresponding to an input blank period is removed from the driving frame in the variable frequency mode, the training synchronizing signal is activated in the variable blank period, and thus, a phase locked loop in the data driver periodically performs a training operation.

Accordingly, when an abnormal operation, e.g., a malfunction or an abnormal operation due to a static electricity, occurs in the data driver, an operation that retrains the phase locked loop to normally recover the data driver is performed even in the structure in which the blank period is removed.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
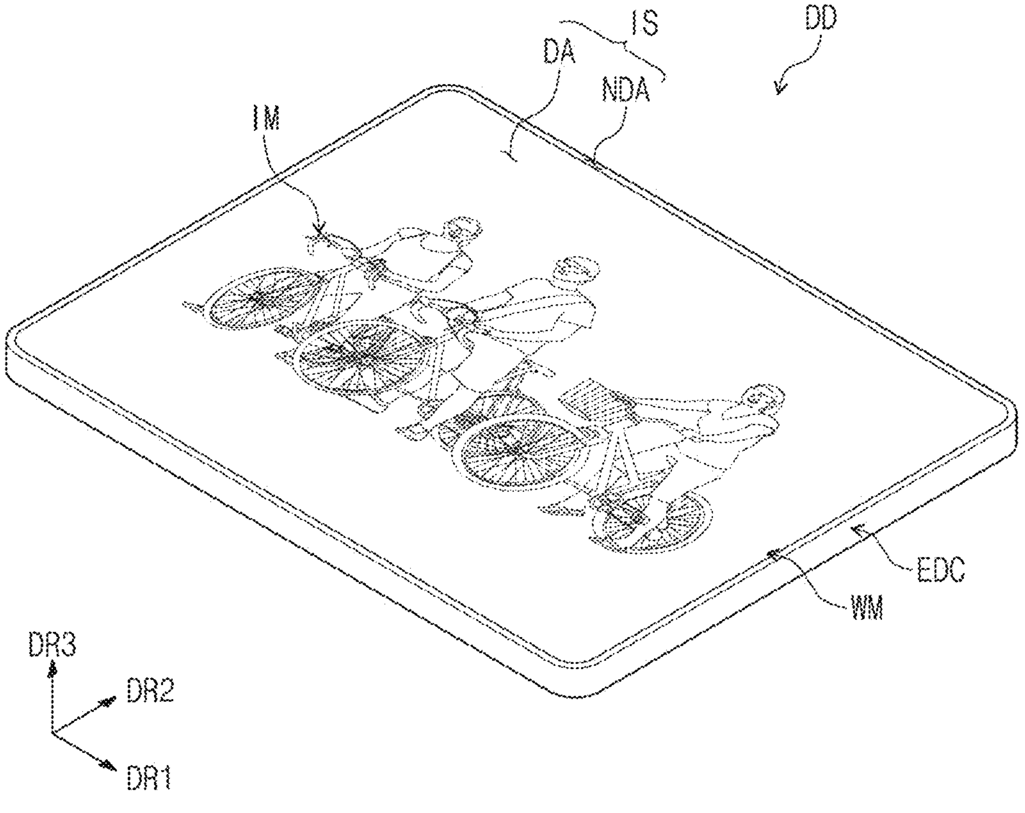
FIG. 1 is a perspective view of a display device according to an embodiment of the present disclosure.

In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise. For example, "an element" has the same meaning as "at least one element," unless the context clearly indicates otherwise. "At least one" is not to be construed as limiting "a" or "an." "Or" means "and/or."

Spatially relative terms, such as "beneath", "below", "lower", "above", "upper" and the like, may be used herein for ease of description to describe one element or feature's relationship to another elements or features as shown in the figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. Hereinafter, embodiments of the present disclosure will be described with reference to accompanying drawings.

Figure 2:
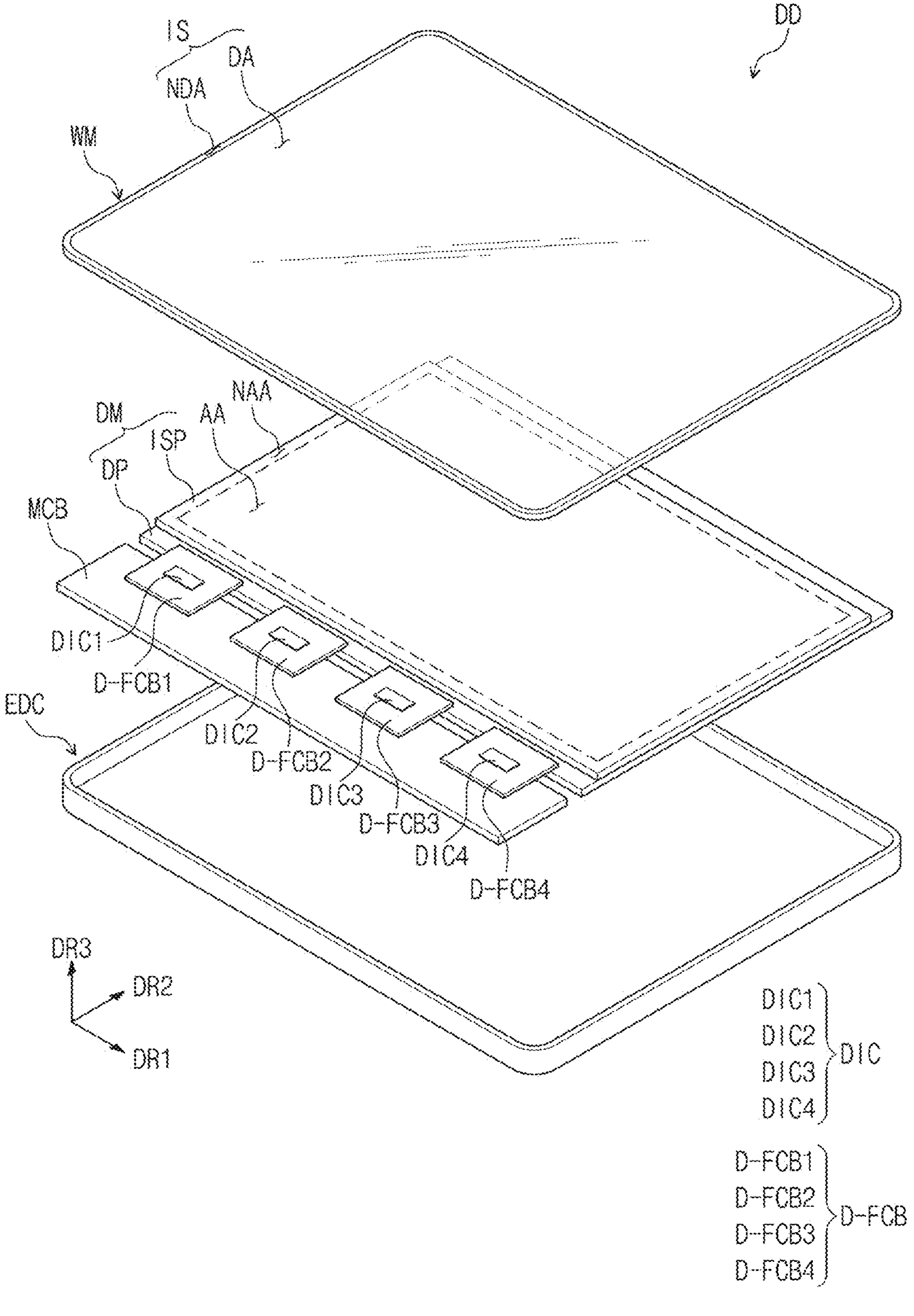
FIG. 2 is an exploded perspective view of a display device according to an embodiment of the present disclosure.

FIG. 1 is a perspective view of a display device DD according to an embodiment of the present disclosure. FIG. 2 is an exploded perspective view of the display device DD according to an embodiment of the present disclosure.

Referring to FIGS. 1 and 2, the display device DD may be a device activated in response to electrical signals. The display device DD may be applied to a large-sized display device, such as a television set or a monitor, and a small and medium-sized display device, such as a mobile phone, a tablet computer, a notebook computer, a car navigation unit, or a game unit. However, these are merely examples, and the display device DD may be applied to other electronic devices as long as they do not depart from the concept of the present disclosure. The display device DD may have a rectangular shape defined by long sides extending in a first direction DR1 and short sides extending in a second direction DR2 crossing the first direction DR1. However, the shape of the display device DD should not be limited to the rectangular shape, and the display device DD may have a variety of shapes. The display device DD may display an image IM toward a third direction DR3 through a display surface IS that is substantially parallel to each of the first direction DR1 and the second direction DR2. The display surface IS through which the image IM is displayed may correspond to a front surface of the display device DD.

In the present embodiment, front (or upper) and rear (or lower) surfaces of each member may be defined with respect to the direction in which the image IM is displayed. The front and rear surfaces may be opposite to each other in the third direction DR3, and a normal line direction of each of the front and rear surfaces may be substantially parallel to the third direction DR3.

A separation distance in the third direction DR3 between the front surface and the rear surface may correspond to a thickness in the third direction DR3 of the display device DD. Meanwhile, directions indicated by the first, second, and third directions DR1, DR2, and DR3 may be relative to each other and may be changed to other directions.

The display device DD may sense an external input applied thereto from the outside. The external input may include inputs of various forms provided from the outside of the display device DD. The display device DD may sense an external input generated by a user and applied thereto. The external input by the user may include one of various forms of external inputs, such as a portion of the user's body, light, heat, gaze, or pressure, or a combination thereof. In addition, the display device DD may sense the external input applied to a side surface or a rear surface thereof by the user, however, it should not be limited thereto or thereby. According to an embodiment, the external input may include inputs generated by an input device, e.g., a stylus pen, an active pen, a touch pen, an electronic pen, an e-pen, or the like.

The display surface IS of the display device DD may include a display area DA and a non-display area NDA. The display area DA may be an area through which the image IM is displayed. The user may view the image IM through the display area DA. In the present embodiment, the display area DA may have a quadrangular shape with rounded vertices, however, this is merely an example. The display area DA may have a variety of shapes and should not be particularly limited.

The non-display area NDA may be defined adjacent to the display area DA. The non-display area NDA may have a predetermined color. The non-display area NDA may surround the display area DA. Accordingly, the display area DA may have a shape substantially defined by the non-display area NDA, however, this is merely an example. According to an embodiment, the non-display area NDA may be disposed adjacent to only one side of the display area DA or may be omitted. The display device DD may include various embodiments and should not be particularly limited.

Referring to FIG. 2, the display device DD may include a display module DM and a window WM disposed on the display module DM. The display module DM may include a display panel DP and an input sensing layer ISP.

According to an embodiment, the display panel DP may be a light-emitting type display panel. As an example, the display panel DP may be an organic light emitting display panel, an inorganic light emitting display panel, or a quantum dot light emitting display panel. A light emitting layer of the organic light emitting display panel may include an organic light emitting material. Alight emitting layer of the inorganic light emitting display panel may include an inorganic light emitting material. Alight emitting layer of the quantum dot light emitting display panel may include a quantum dot or a quantum rod.

The display panel DP may output the image IM, and the output image IM may be displayed through the display surface IS.

The input sensing layer ISP may be disposed on the display panel DP and may sense the external input. The input sensing layer ISP may be disposed directly on the display panel DP. According to the present embodiment, the input sensing layer ISP may be formed on the display panel DP through successive processes. That is, when the input sensing layer ISP is disposed directly on the display panel DP, an adhesive film may not be disposed between the input sensing layer ISP and the display panel DP. However, an inner adhesive film may be disposed between the input sensing layer ISP and the display panel DP In this case, the input sensing layer ISP may not be manufactured through the successive processes with the display panel DP, and the input sensing layer ISP may be fixed to an upper surface of the display panel DP by the inner adhesive film after being manufactured through a separate process.

The window WM may include a transparent material through which an image transmits. For example, the window WM may include glass, sapphire, or plastic. The window WM is shown as a single layer, however, it should not be limited thereto or thereby. The window WM may include a plurality of layers.

Meanwhile, although not shown in figures, the non-display area NDA of the display device DD may be obtained by printing a material having the predetermined color on an area of the window WM. As an example, the window WM may include a light blocking pattern to define the non-display area NDA. The light blocking pattern may be a colored organic layer and may be formed by a coating method.

The window WM may be coupled to the display module DM by an adhesive film. As an example, the adhesive film may include an optically clear adhesive film ("OCA"). However, the adhesive film should not be limited thereto or thereby, and the adhesive film may include a conventional adhesive. For example, the adhesive film may include an optically clear resin ("OCR") or a pressure sensitive adhesive film ("PSA").

An anti-reflective layer may be further disposed between the window WM and the display module DM. The anti-reflective layer may reduce a reflectance with respect to an external light incident thereto from the above of the window WM. The anti-reflective layer according to the present disclosure may include a retarder and a polarizer. The retarder may be a film type or liquid crystal coating type and may include a λ/2 retarder and/or a λ/4 retarder. The polarizer may be a film type or liquid crystal coating type. The film type polarizer and retarder may include a stretching type synthetic resin film, and the liquid crystal coating type polarizer and retarder may include liquid crystals aligned in a predetermined alignment. The retarder and the polarizer may be implemented as one polarizing film.

As an example, the anti-reflective layer may include color filters. An arrangement of the color filters may be determined by taking into account colors of lights generated by pixels PX (refer to FIG. 3) included in the display panel DP. In this case, the anti-reflective layer may further include a light blocking pattern. Alternatively, the anti-reflective layer may include a pigment or dye.

The display module DM may display the image IM in response to electrical signals and may transmit/receive information on the external input. The display module DM may include an effective area AA and a non-effective area NAA, which are defined therein. The effective area AA may be defined as an area through which the image IM provided from the display panel DP exits, i.e., an area through which the image IM is displayed. In addition, the effective area AA may be defined as an area where the input sensing layer ISP senses the external input applied thereto from the outside. According to an embodiment, the effective area AA of the display module DM may correspond to or overlap at least a portion of the display area DA.

The non-effective area NAA may be defined adjacent to the effective area AA. The non-effective area NAA may be an area where the image IM is not displayed. For instance, the non-effective area NAA may surround the effective area AA. However, this is merely an example, and the non-effective area NAA may be defined in various shapes and should not be particularly limited. According to the embodiment, the non-effective area NAA of the display module DM may correspond to or overlap at least a portion of the non-display area NDA.

The display module DM may further include a main circuit board MCB, flexible circuit films D-FCB, and driving chips DIC. The main circuit board MCB may be connected to the flexible circuit films D-FCB and may be electrically connected to the display panel DP. The flexible circuit films D-FCB may be connected to the display panel DP to electrically connect the display panel DP to the main circuit board MCB. The main circuit board MCB may include a plurality of driving elements. The driving elements may include a circuit unit to drive the display panel DP. The driving chips DIC may be mounted on the flexible circuit film D-FCB.

As an example, the flexible circuit films D-FCB may include a first flexible circuit film D-FCB1, a second flexible circuit film D-FCB2, a third flexible circuit film D-FCB3, and a fourth flexible circuit film D-FCB4. As an example, the driving chips DIC may include a first driving chip DIC1, a second driving chip DIC2, a third driving chip DIC3, and a fourth driving chip DIC4. The first, second, third, and fourth flexible circuit films D-FCB1, D-FCB2, D-FCB3, and D-FCB4 may be arranged spaced apart from each other in the first direction DR1 and may be connected to the display panel DP, and thus, the display panel DP may be electrically connected to the main circuit board MCB. The first driving chip DIC1 may be mounted on the first flexible circuit film D-FCB1, and the second driving chip DIC2 may be mounted on the second flexible circuit film D-FCB2. The third driving chip DIC3 may be mounted on the third flexible circuit film D-FCB3, and the fourth driving chip DIC4 may be mounted on the fourth flexible circuit film D-FCB4. However, the present disclosure should not be limited thereto or thereby. As an example, the display panel DP may be electrically connected to the main circuit board MCB via one flexible circuit film, and one or more driving chips may be mounted on the one flexible circuit film. In addition, the number of the driving chips should not be particularly limited, and two or more driving chips may be provided in the present disclosure.

FIG. 2 shows a structure in which the first, second, third, and fourth driving chips DIC1, DIC2, DIC3, and DIC4 are mounted on the first, second, third, and fourth flexible circuit films D-FCB1, D-FCB2, D-FCB3, and D-FCB4, respectively, however, the present disclosure should not be limited thereto or thereby. As an example, the first, second, third, and fourth driving chips DIC1, DIC2, DIC3, and DIC4 may be directly mounted on the display panel DP. In this case, portions of the display panel DP on which the first, second, third, and fourth driving chip DIC1, DIC2, DIC3, and DIC4 are mounted may be bent and may be disposed on a rear surface of the display module DM. Alternatively, the first, second, third, and fourth driving chips DIC1, DIC2, DIC3, and DIC4 may be directly mounted on the main circuit board MCB.

The input sensing layer ISP may be electrically connected to the main circuit board MCB via the flexible circuit films D-FCB, however, the present disclosure should not be limited thereto or thereby. That is, the display module DM may further include a separate flexible circuit film to electrically connect the input sensing layer ISP to the main circuit board MCB.

The display device DD may further include an external case EDC accommodating the display module DM. The external case EDC may be coupled with the window WM to define an exterior of the display device DD. The external case EDC may absorb impacts applied thereto from the outside and may prevent foreign substances/moisture from entering the display module DM to protect components accommodated in the external case EDC. Meanwhile, as an example, the external case EDC may be obtained by assembling a plurality of accommodating members.

The display device DD may further include an electronic module including various functional modules to operate the display module DM, a power supply module, e.g., a battery, supplying a power source for an overall operation of the display device DD, and a bracket coupled with the display module DM and/or the external case EDC to divide an inner space of the display device DD.

Figure 3:
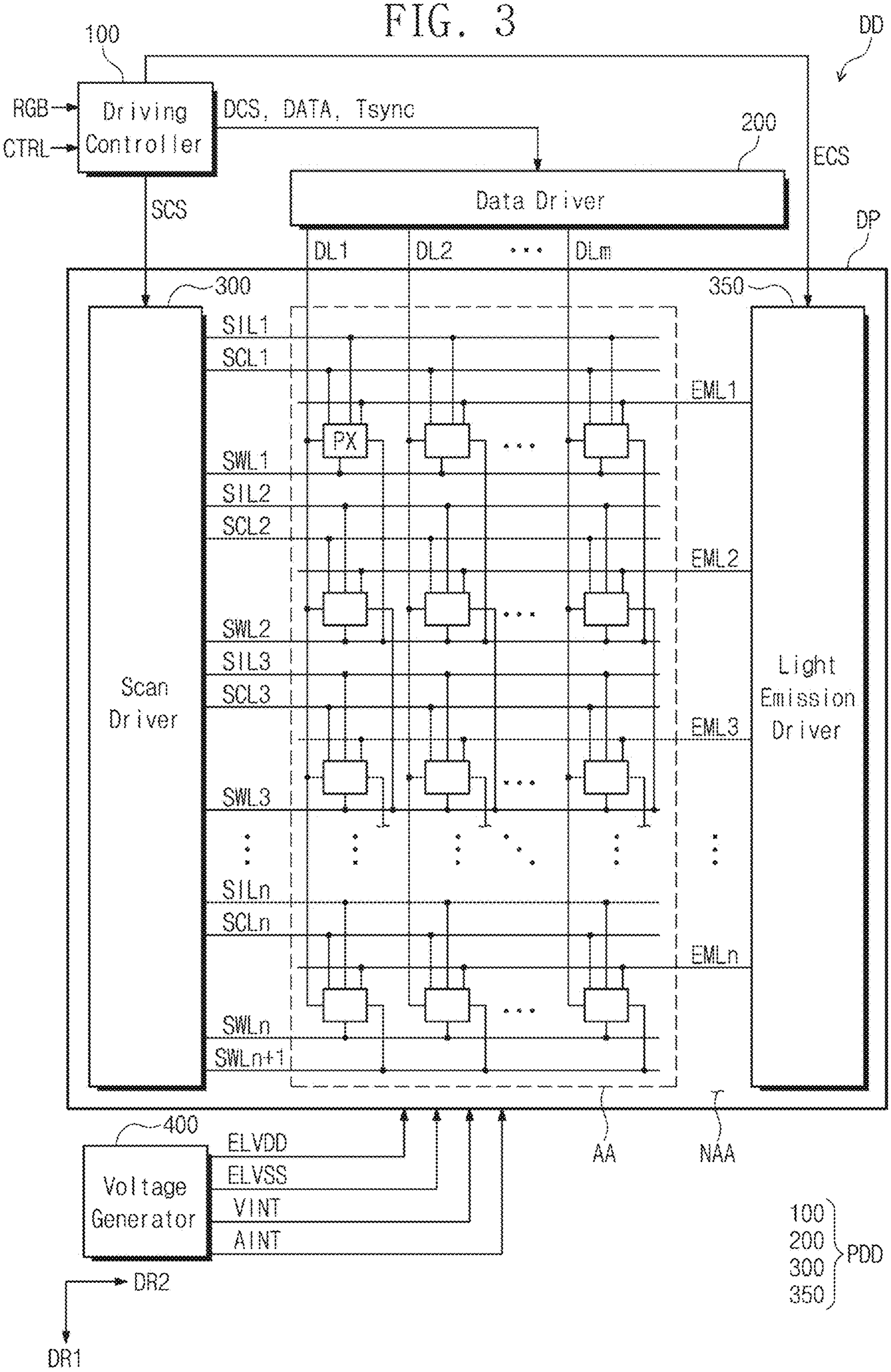
FIG. 3 is a block diagram of a display device according to an embodiment of the present disclosure.

FIG. 3 is a block diagram of the display device DD according to an embodiment of the present disclosure.

Referring to FIG. 3, the display device DD may include the display panel DP and a panel driver PDD driving the display panel DP. As an example, the panel driver PDD may include a driving controller 100, a data driver 200, a scan driver 300, and a light emission driver 350.

The driving controller 100 may receive an input image signal RGB and control signals CTRL from a host processor. As an example, the host processor may be a graphics processing unit ("GPU"). The driving controller 100 may convert a data format of the input image signal RGB to a data format appropriate to an interface between the data driver 200 and the driving controller 100 to generate image data DATA. The control signals CTRL may include a vertical synchronizing signal Vsync (refer to FIG. 5), an input data enable signal I_DE (refer to FIG. 5), and a master clock signal, however, they should not be limited thereto or thereby. The driving controller 100 may generate a first driving control signal SCS, a second driving control signal DCS, and a third driving control signal ECS based on the control signals CTRL.

The data driver 200 may receive the second driving control signal DCS and the image data DATA from the driving controller 100. The data driver 200 may convert the image data DATA to data signals and may output the data signals to a plurality of data lines DL1 to DLm described later. The data signals may be analog voltages corresponding to grayscale values of the image data DATA. As an example, the data driver 200 may include a plurality of driving chips, e.g., the first to fourth driving chips DIC1 to DIC4 shown in FIG. 2.

The data driver 200 may further receive a training synchronizing signal T_Sync from the driving controller 100. The training synchronizing signal T_Sync may be a signal used to train a phase locked loop ("PLL") in the data driver 200.

The scan driver 300 may receive the first driving control signal SCS from the driving controller 100. The scan driver 300 may output scan signals to scan lines in response to the first driving control signal SCS.

The display device DD may further include a voltage generator 400. The voltage generator 400 may generate voltages to operate the display panel DP In the present embodiment, the voltage generator 400 may generate a first driving voltage ELVDD, a second driving voltage ELVSS, a first initialization voltage VINT, and a second initialization voltage AINT.

The display panel DP may include initialization scan lines SIL1 to SILn, compensation scan lines SCL1 to SCLn, write scan lines SWL1 to SWLn+1, light emission control lines EML1 to EMLn, the data lines DL1 to DLm, and the pixels PX. The initialization scan lines SIL1 to SILn, the compensation scan lines SCL1 to SCLn, the write scan lines SWL1 to SWLn+1, the light emission control lines EML1 to EMLn, the data lines DL1 to DLm, and the pixels PX may overlap the effective area AA. The initialization scan lines SIL1 to SILn, the compensation scan lines SCL1 to SCLn, the write scan lines SWL1 to SWLn+1, and the light emission control lines EML1 to EMLn may extend in the second direction DR2. The initialization scan lines SIL1 to SILn, the compensation scan lines SCL1 to SCLn, the write scan lines SWL1 to SWLn+1, and the light emission control lines EML1 to EMLn may be arranged in the first direction DR1 and may be spaced apart from each other. The data lines DL1 to DLm may extend in the first direction DR1 and may be arranged spaced apart from each other in the second direction DR2. Here, n and m are integers.

The pixels PX may be electrically connected to the initialization scan lines SIL1 to SILn, the compensation scan lines SCL1 to SCLn, the write scan lines SWL1 to SWLn+1, the light emission control lines EML1 to EMLn, and the data lines DL1 to DLm. Each of the pixels PX may be electrically connected to four scan lines. As an example, as shown in FIG. 3, pixels arranged in a first row may be connected to a first initialization scan line SILT, a first compensation scan line SCL1, a first write scan line SWL1, and a second write scan line SWL2. In addition, pixels arranged in a second row may be connected to a second initialization scan line SIL2, a second compensation scan line SCL2, the second write scan line SWL2, and a third write scan line SWL3. However, the number of the scan lines connected to each pixel PX should not be limited thereto or thereby and may be changed in various ways. Alternatively, each of the pixels PX may be electrically connected to five scan lines, and in this case, the display panel DP may further include black scan lines.

The scan driver 300 may be disposed in the non-effective area NAA of the display panel DP. The scan driver 300 may receive the first driving control signal SCS from the driving controller 100. Responsive to the first driving control signal SCS, the scan driver 300 may output initialization scan signals to the initialization scan lines SIL1 to SILn, may output compensation scan signals to the compensation scan lines SCL1 to SCLn, and may output write scan signals to the write scan lines SWL1 to SWLn+1. A circuit configuration and an operation of the scan driver 300 will be described in detail later.

The light emission driver 350 may receive the third driving control signal ECS from the driving controller 100. The light emission driver 350 may output light emission control signals to the light emission control lines EML1 to EMLn in response to the third driving control signal ECS. According to an embodiment, the scan driver 300 may be connected to the light emission control lines EML1 to EMLn. In this case, the scan driver 300 may output the light emission control signals to the light emission control lines EML1 to EMLn.

Each of the pixels PX may include a light emitting element ED (refer to FIG. 8) and a pixel circuit part PXC (refer to FIG. 8) that controls a light emission of the light emitting element ED. The pixel circuit part PXC may include a plurality of transistors and a capacitor. The scan driver 300 and the light emission driver 350 may include transistors that are formed through the same processes as those of the pixel circuit part PXC.

Each of the pixels PX may receive the first driving voltage ELVDD, the second driving voltage ELVSS, the first initialization voltage VINT, and the second initialization voltage AINT from the voltage generator 400.

Figure 4:
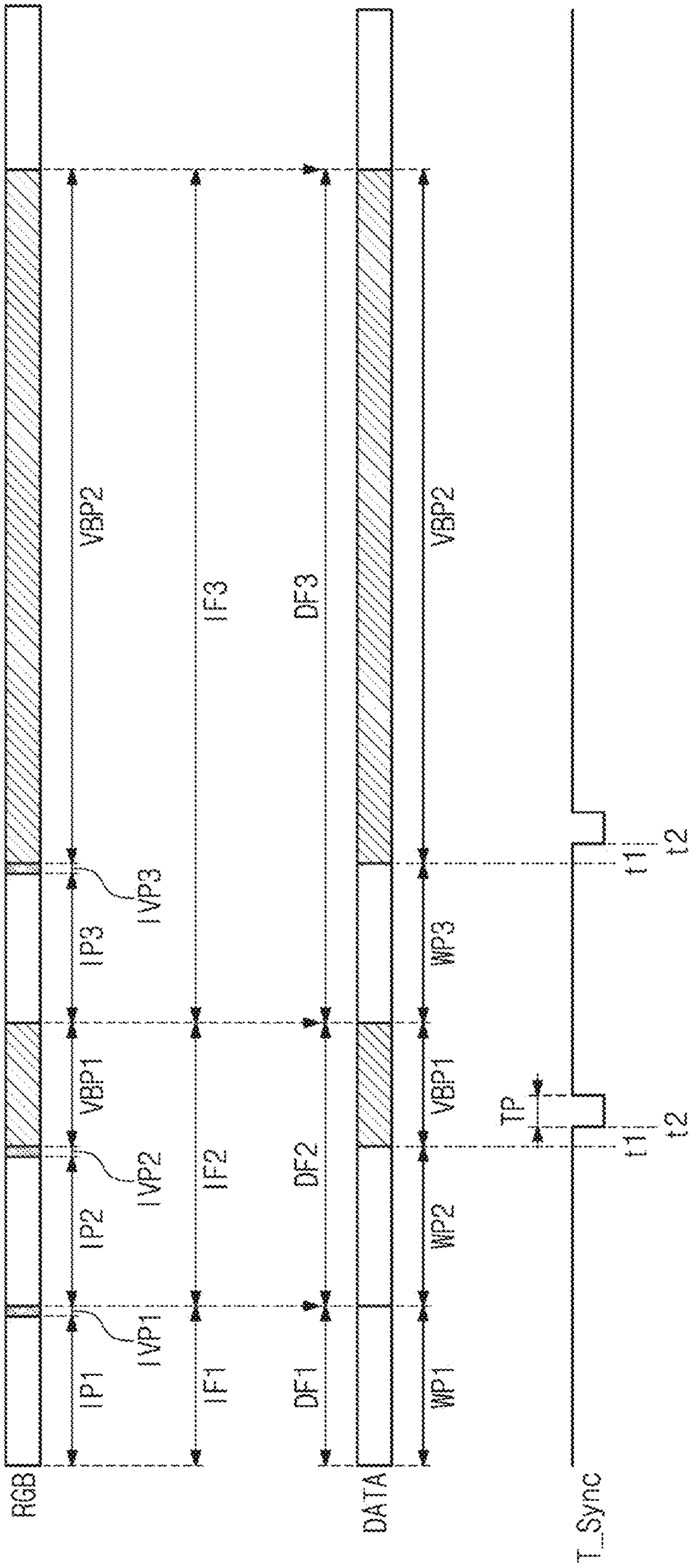
FIG. 4 is a waveform diagram showing output timings of an input frequency of an input image signal, an output frequency of image data, and a training synchronizing signal according to an embodiment of the present disclosure.
Figure 5:
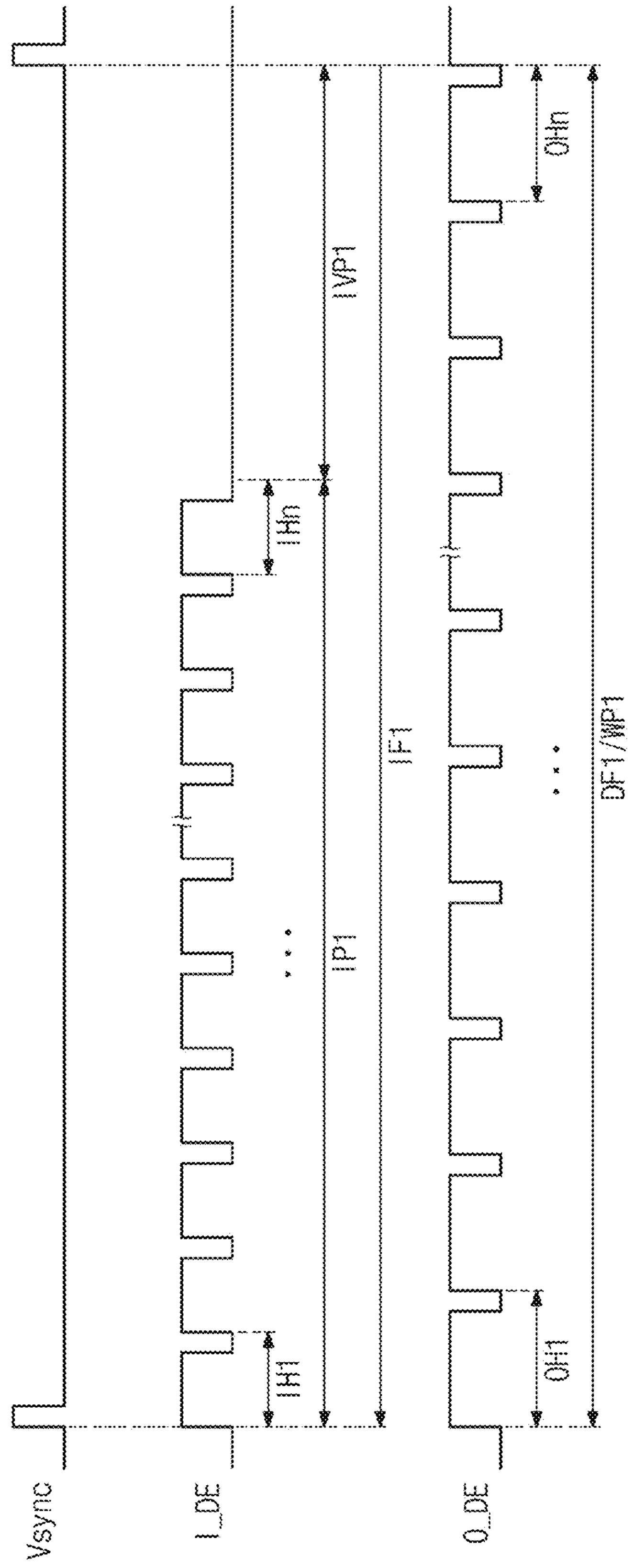
FIG. 5 is a waveform diagram of an input data enable signal and an output data enable signal according to an embodiment of the present disclosure.

FIG. 4 is a waveform diagram showing output timings of an input frequency of the input image signal, an output frequency of the image data, and the training synchronizing signal according to an embodiment of the present disclosure. FIG. 5 is a waveform diagram of the vertical synchronizing signal, the input data enable signal, and an output data enable signal according to an embodiment of the present disclosure.

Referring to FIGS. 3 and 4, the driving controller 100 may support a variable frequency mode. The host processor may change a duration of variable blank periods VBP1 and VBP2 in every input frame and may provide the input image signal RGB to the driving controller 100 at a variable frame rate. The driving controller 100 that supports the variable frequency mode may provide the image data DATA to the panel driver PDD, e.g., the data driver 200, in synchronization with the variable frame rate, and thus, the image may be controlled to be displayed at the variable frame rate.

In this case, a cycle at which the driving controller 100 receives the input image signal RGB may be defined as input frames IF1, IF2, and IF3, and a cycle at which the driving controller 100 outputs the image data DATA may be defined as driving frames DF1, DF2, and DF3. An input frequency of the input image signal RGB may vary in the variable frequency mode. As an example, a first input frame IF1 may have a first input frequency, e.g., a frequency of about 240 Hertz (Hz), a second input frame IF2 may have a second input frequency, e.g., a frequency of about 137 Hz, that is lower than the first input frequency, and a third input frame IF3 may have a third input frequency, e.g., a frequency of about 46 Hz, that is lower than the second input frequency. Accordingly, the first, second, and third input frames IF1, IF2, and IF3 may have different durations from each other.

The first input frame IF1 may include a first input period IP1 and a first input blank period IVP1, the second input frame IF2 may include a second input period IP2 and a second input blank period IVP2, and the third input frame IF3 may include a third input period IP3 and a third input blank period IVP3. The first to third input periods IP1 to IP3 may have substantially the same duration as each other, and the first to third input blank periods IVP1 to IVP3 may have substantially the same duration as each other.

The highest frequency among the input frequencies of the input frames may be set as a reference frequency. As an example, when the first input frequency among the first to third input frequencies is set as the reference frequency, the second and third input frames IF2 and IF3 each having a frequency lower than the reference frequency may further include a variable blank period. That is, the second input frame IF2 may further include a first variable blank period VBP1, and the third input frame IF3 may further include a second variable blank period VBP2. In a case where the second and third input frames IF2 and IF3 have different input frequencies from each other, the first and second variable blank periods VBP1 and VBP2 may have different durations from each other. As an example, when the second input frame IF2 has the input frequency higher than the frequency of the third input frame IF3, the duration of the second variable blank period VBP2 may be greater than the duration of the first variable blank period VBP1. That is, the durations of the first and second variable blank periods VBP1 and VBP2 may vary depending on the input frequencies of the second and third input frames IF2 and IF3.

In the variable frequency mode, the output frequency of the image data DATA may vary. As an example, a first driving frame DFT may have a first frequency, e.g., a frequency of about 240 Hz, a second driving frame DF2 may have a second frequency, e.g., a frequency of about 137 Hz, which is lower than the first frequency, and a third driving frame DF3 may have a third frequency, e.g., a frequency of about 46 Hz, which is lower than the second frequency. Accordingly, the first, second, and third driving frames DF1, DF2, and DF3 may have different durations from each other.

As an example, the driving frames DF1, DF2, and DF3 may have the same frequencies as the corresponding input frequencies of the input frames IF1, IF2, and IF3, respectively, in the variable frequency mode. In detail, the first frequency of the first driving frame DF T may be the same as the first input frequency of the first input frame IF1, the second frequency of the second driving frame DF2 may be the same as the second input frequency of the second input frame IF2, and the third frequency of the third driving frame DF3 may be the same as the third input frequency of the third input frame IF3.

Each of the driving frames DF1, DF2, and DF3 may include a write period. In detail, the first driving frame DFT may include a first write period WP1, the second driving frame DF2 may include a second write period WP2, and the third driving frame DF3 may include a third write period WP3. Although the first to third driving frames DF T to DF3 have different frequencies from each other in the variable frequency mode, the first to third write periods WP1 to WP3 may have the same duration as each other.

The highest frequency among the frequencies of the driving frames may be set as a reference frequency. As an example, in a case where the first frequency among the first to third frequencies is set as the reference frequency, the second and third driving frames DF2 and DF3 each having the frequency lower than the reference frequency may further include a variable blank period. That is, the second driving frame DF2 may further include the first variable blank period VBP1, and the third driving frame DF3 may further include the second variable blank period VBP2. When the second and third driving frames DF2 and DF3 have different frequencies from each other, the first and second variable blank periods VBP1 and VBP2 may have different durations from each other. As an example, when the second driving frame DF2 has the frequency higher than the frequency of the third driving frame DF3, the duration of the second variable blank period VBP2 may be greater than the duration of the first variable blank period VBP1. That is, the durations of the first and second variable blank periods VBP1 and VBP2 may vary depending on the frequencies of the second and third driving frames DF2 and DF3.

As shown in FIGS. 4 and 5, each of the input periods IP1, IP2, and IP3 of the first, second, and third input frames IF1, IF2, and IF3 may include N input horizontal periods IH1 to IHn. Each of the first, second, and third input frames IF1, IF2, and IF3 may be determined by a cycle of the vertical synchronizing signal Vsync. Each of the input periods IP1, IP2, and IP3 of the first, second, and third input frames IF1, IF2, and IF3 may be defined as a period in which the input data enable signal I_DE is periodically activated, and each of the input blank periods IVP1, IVP2, and IVP3 may be defined as a period in which the input data enable signal I_DE is maintained in an inactive state.

The vertical synchronizing signal Vsync and the input data enable signal I_DE may be included in the control signal CTRL input to the driving controller 100. As an example, the driving controller 100 may generate the output data enable signal O_DE based on the input data enable signal I_DE and the vertical synchronizing signal Vsync. The driving controller 100 may output the image data DATA in response to the output data enable signal O_DE.

Each of the first to third write periods WP1 to WP3 may include N horizontal periods OH1 to OHn. Each of the horizontal periods OH1 to OHn may have a first duration. In this case, each of the first to third write periods WP1 to WP3 may have a second duration that corresponds to N times of the first duration, in particular, that is substantially the same as N times of the first duration. As an example, the first duration may be greater than a duration of each of the input horizontal periods IH1 to IHn.

As described above, in the case where the second duration of each of the first to third write periods WP1 to WP3 corresponds to N times of the first duration, i.e., when the second duration is the same as N times of the first duration, blank periods corresponding to the input blank periods IVP1 to IVP3 may be removed from the driving frames DF1 to DF3. However, only the blank period (i.e., the variable blank periods VBP1 and VBP2) according to the variation of the frequency may exist in some driving frames DF2 and DF3 of the driving frames DF1 to DF3. When the first frequency is set as the reference frequency, the first driving frame DF1 may include only the first write period WP1 and may not include both the blank period corresponding to the first input blank period IVP1 and the variable blank period.

Referring to FIGS. 3 and 4 again, the driving controller 100 may apply the training synchronizing signal T_Sync to the data driver 200 during the variable blank periods VBP1 and VBP2. The training synchronizing signal T_Sync may include a training pattern and synchronization information. The training synchronizing signal T_Sync may be applied to each of the first to fourth driving chips DIC1 to DIC4 shown in FIG. 2. In this case, each of the first to fourth driving chips DIC1 to DIC4 may include a phase locked loop that receives the training synchronizing signal T_Sync.

As an example, the training synchronizing signal T_Sync may be activated in each of the variable blank periods VBP1 and VBP2. In detail, the training synchronizing signal T_Sync may be activated at a second time point t2 after a predetermined reference time lapses from a first time point t1 at which each of the variable blank periods VBP1 and VBP2 starts. FIG. 4 shows a case where there is a time difference between the first and second time points t1 and t2, corresponding to the predetermined reference time, however, the present disclosure should not be limited thereto or thereby. Alternatively, the first and second time points t1 and t2 may substantially coincide with each other. The training synchronizing signal T_Sync may be activated for a predetermined period (hereinafter, referred to as a training period TP) in each of the variable blank periods VBP1 and VBP2. In this case, a duration of the training period TP may be smaller than the duration of each of the variable blank periods VBP1 and VBP2.

As described above, in the case where the blank period corresponding to the input blank periods IVP1 to IVP3 are removed from the driving frames DFT to DF3, the training synchronizing signal T_Sync may be activated in the variable blank periods VBP1 and VBP2, and thus, the phase locked loop of the data driver 200 may periodically perform the training operation.

Accordingly, even in the structure in which the blank period is removed, an operation that retrains the phase locked loop to normally recover the data driver 200 may be performed when an abnormal operation, for example, a malfunction or an abnormal operation due to static electricity, occurs in the data driver 200.

Figure 6:
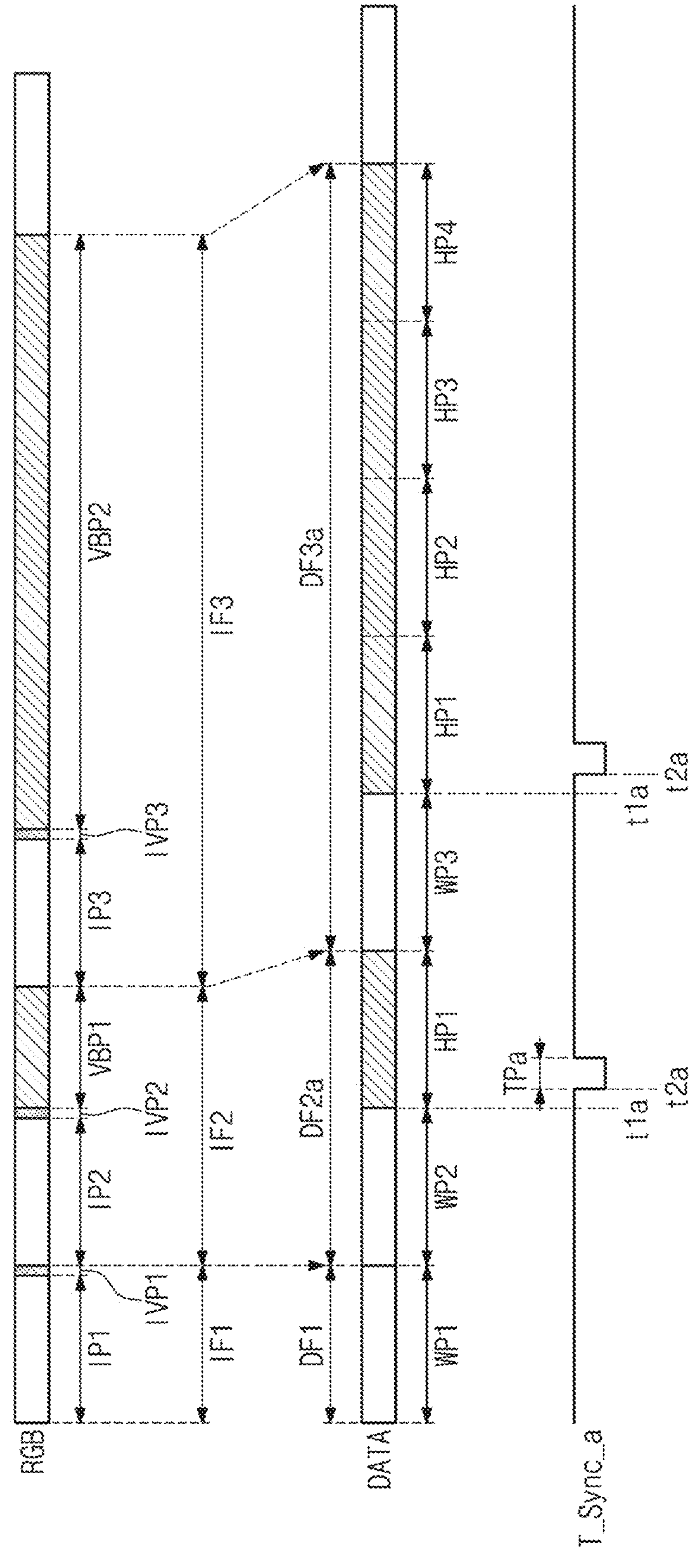
FIG. 6 is a waveform diagram showing output timings of an input frequency of an input image signal, an output frequency of image data, and a training synchronizing signal according to another embodiment of the present disclosure.

FIG. 6 is a waveform diagram showing output timings of an input frequency of an input image signal, an output frequency of image data, and a training synchronizing signal according to another embodiment of the present disclosure. In FIG. 6, the same reference numerals denote the same elements in FIG. 4, and thus, detailed descriptions of the same elements will be omitted.

Referring to FIG. 6, the input frequency of the input image signal RGB may vary in a variable frequency mode. As an example, a first input frame IF1 may have a first input frequency, e.g., a frequency of about 240 Hz, a second input frame IF2 may have a second input frequency, e.g., a frequency of about 137 Hz, which is lower than the first input frequency, and a third input frame IF3 may have a third input frequency, e.g., a frequency of about 46 Hz, which is lower than the second input frequency. Accordingly, the first, second, and third input frames IF1, IF2, and IF3 may have different durations from each other.

The output frequency of the image data DATA may vary in the variable frequency mode. As an example, a first driving frame DFT may have a first frequency, e.g., a frequency of about 240 Hz, a second driving frame DF2*a* may have a second frequency, e.g., a frequency of about 120 Hz, which is lower than the first frequency, and a third driving frame DF3*a* may have a third frequency, e.g., a frequency of about 48 Hz, which is lower than the second frequency. Accordingly, the first, second, and third driving frames DF1, DF2*a*, and DF3*a* may have different durations from each other.

As an example, the driving frames DF1, DF2*a*, and DF3*a* may have the frequencies that are the same as or different from the input frequencies of the input frames IF1, IF2, and IF3, respectively, in the variable frequency mode. In detail, the first frequency of the first driving frame DF1 may be the same as the first input frequency of the first input frame IF1, the second frequency of the second driving frame DF2*a* may be different from the second input frequency of the second input frame IF2, and the third frequency of the third driving frame DF3*a* may be different from the third input frequency of the third input frame IF3. The first input frequency of the first input frame IF1 may not be an integer multiple of the second input frequency of the second input frame IF2 and may not be an integer multiple of the third input frequency of the third input frame IF3. However, the first frequency of the first driving frame DFT may be an integer multiple, e.g., two times, of the second frequency of the second driving frame DF2*a* and may be an integer multiple, e.g., five times, of the third frequency of the third driving frame DF3*a*.

Each of the driving frames DF1, DF2*a*, and DF3*a* may include a write period. The write period may be a period in which a data signal is substantially output from the data driver 200 to display the image. In detail, the first driving frame DFT may include a first write period WP1, the second driving frame DF2*a* may include a second write period WP2, and the third driving frame DF3*a* may include a third write period WP3. Even though the frequencies of the first, second, and third driving frames DF1, DF2*a*, and DF3*a* are different from each other in the variable frequency mode, the first to third write periods WP1 to WP3 may have substantially the same duration.

As an example, in a case where the first frequency among the first to third frequencies is set as a reference frequency, the second and third driving frames DF2*a* and DF3*a* each having the frequency lower than the reference frequency may further include a holding period. The holding period may be a period in which the data signal to display the image is not output from the data driver 200, and a constant voltage, e.g., a bias voltage or a black grayscale voltage, is maintained.

As an example, the second driving frame DF2*a* may include at least one holding period, e.g., a first holding period HP1, in addition to the second write period WP2, and the third driving frame DF3*a* may include at least one holding period, e.g., first to fourth holding periods HP1 to HP4, in addition to the third write period WP3. In the case where the second and third driving frames DF2*a* and DF3*a* have different frequencies from each other, the number of the holding periods included in the second driving frame DF2*a* may be different from the number of holding periods included in the third driving frame DF3*a*. As an example, in the case where the third driving frame DF3*a* has the frequency lower than the frequency of the second driving frame DF2*a*, the number of the holding periods included in the third driving frame DF3*a* may be greater than the number of the holding periods included in the second driving frame DF2*a*. The number of the holding periods may vary depending on the frequency of the second and third driving frames DF2*a* and DF3*a*.

As an example, the first to fourth holding periods HP1 to HP4 may have substantially the same duration. In addition, each of the first to fourth holding periods HP1 to HP4 may have substantially the same duration as the duration of each of the first, second, and third write periods WP1, WP2, and WP3.

Referring to FIGS. 5 and 6, the first to third write periods WP1 to WP3 may include N horizontal periods OH1 to OHn. Each of the N horizontal periods OH1 to OHn may have a first duration. In this case, each of the first to third write periods WP1 to WP3 may have a second duration corresponding to N times of the first duration, and in particular, the second duration may be substantially the same as N times of the first duration. As an example, the first duration may be greater than a duration of each of input horizontal periods IH1 to IHn.

As described above, in the case where the second duration of each of the first to third write periods WP1 to WP3 corresponds to N times of the first duration, i.e., when the second duration is substantially the same as N times of the first duration, blank periods corresponding to input blank periods IVP1 to IVP3 may be removed from the driving frames DF1, DF2*a*, and DF3*a*. However, at least one holding period may exist in some driving frames DF2*a* and DF3*a* of the driving frames DF1, DF2*a*, and DF3*a* according to the variation of the frequency. When the first frequency is set as the reference frequency, the first driving frame DFT may include only the first write period WPT and may not include both the blank period corresponding to a first input blank period IVP1 and the holding period.

Referring to FIGS. 3 and 6 again, the driving controller 100 may apply a training synchronizing signal T_Sync_a to the data driver 200 during at least one holding period. As an example, the training synchronizing signal T_Sync_a may be activated in at least one holding period. In a case where the driving frame, for example, the second driving frame DF2*a*, includes one holding period HP1, the training synchronizing signal T_Sync_a may be activated in one holding period HPT. However, in a case where the driving frame, for example, the third driving frame DF3*a*, includes the plural holding periods HP1 to HP4, the training synchronizing signal T_Sync_a may activated in the first holding period HP1 among the holding periods HP1 to HP4, however, the present disclosure should not be limited thereto or thereby.

As an example, the training synchronizing signal T_Sync_a may be activated at a second time point t2*a* after a predetermined reference time lapses from a first time point t1*a* at which the first holding period HP1 starts. FIG. 6 shows a case where there is a time difference between the first and second time points t1*a* and t2*a* corresponding to the predetermined reference time, however, the present disclosure should not be limited thereto or thereby. Alternatively, the first and second time points t1*a* and t2*a* may substantially coincide with each other. The training synchronizing signal T_Sync_a may be activated during a predetermined period (hereinafter, referred to as a training period TPa) in the first holding period HPT. In this case, a duration of the training period TPa may be smaller than the duration of the first holding period HPT.

As described above, in the case where the blank period corresponding to the input blank period is removed from the driving frames DF1, DF2*a*, and DF3*a*, the training synchronizing signal T_Sync_a may be activated in at least one holding period, and thus, the phase locked loop of the data driver 200 may periodically perform the training operation.

Accordingly, even in the structure in which the blank period is removed, an operation that retrains the phase locked loop to normally recover the data driver 200 may be performed when an abnormal operation, for example, a malfunction or an abnormal operation due to static electricity, occurs in the data driver 200.

Figure 7:
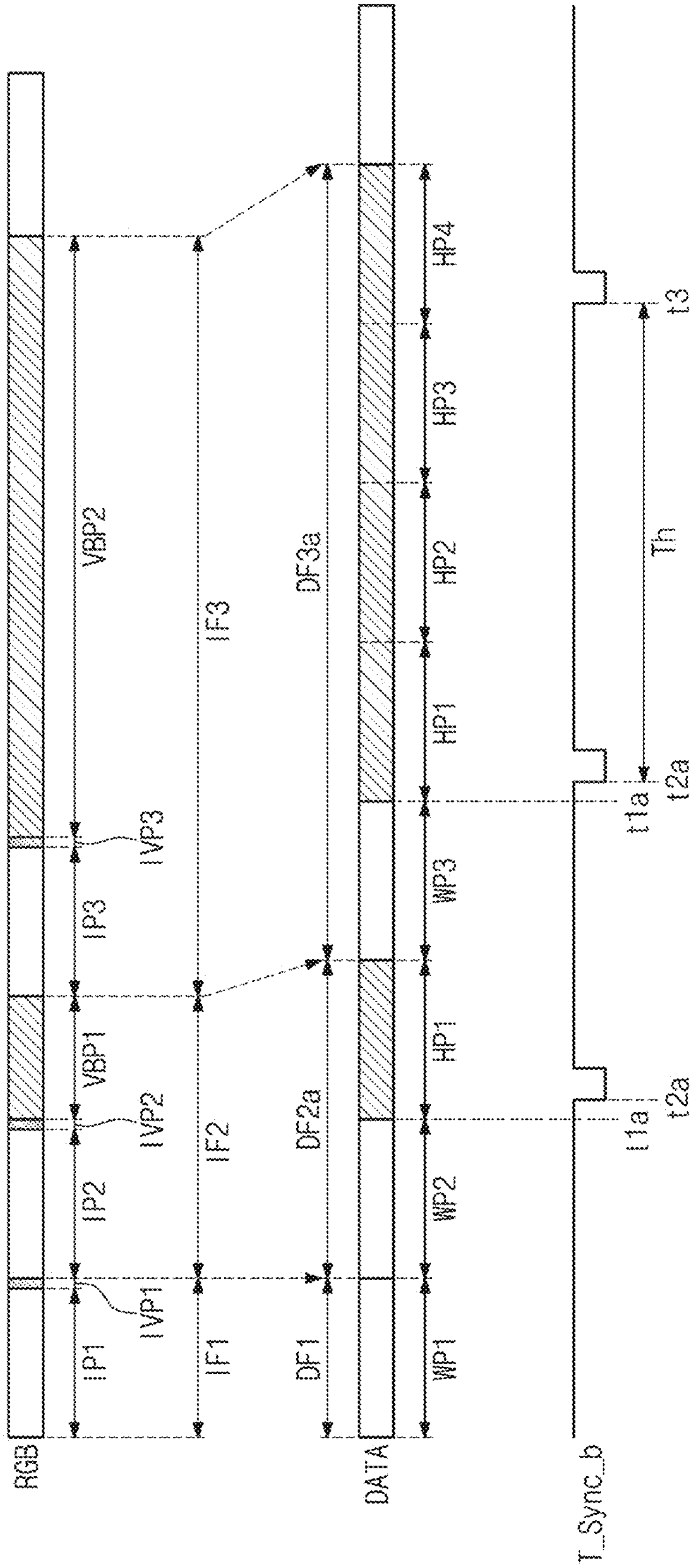
FIG. 7 is a waveform diagram showing output timings of an input frequency of an input image signal, an output frequency of image data, and a training synchronizing signal according to still another embodiment of the present disclosure.

FIG. 7 is a waveform diagram showing output timings of an input frequency of an input image signal, an output frequency of image data, and a training synchronizing signal according to still another embodiment of the present disclosure. In FIG. 7, the same reference numerals denote the same elements in FIG. 6, and thus, detailed descriptions of the same elements will be omitted.

Referring to FIGS. 3 and 7, the driving controller 100 may apply a training synchronizing signal T_Sync_b to the data driver 200 in at least one holding period. As an example, the training synchronizing signal T_Sync_b may be activated in the at least one holding period. In a case where a driving frame, for example, a second driving frame DF2*a*, includes one holding period HP1, the training synchronizing signal T_Sync_b may be activated in the one holding period HPT. However, in a case where a driving frame, for example, a third driving frame DF3*a*, includes a plurality of holding periods HP1 to HP4, the training synchronizing signal T_Sync_b may be activated in a first holding period HP1 among the holding periods HP1 to HP4. However, when a total duration of the holding periods HP1 to HP4 is longer than a predetermined critical time Th, the training synchronizing signal T_Sync_b may also be activated in another holding period, e.g., a fourth holding period HP4, in addition to the first holding period HP1. That is, when the predetermined critical time Th lapses from a second time point t2*a*, the training synchronizing signal T_Sync_b may be further activated at a third time point t3.

Accordingly, when the driving controller 100 is driven at a low frequency in a variable frequency mode, the training synchronizing signal T_Sync_b may be prevented from being inactivated for a long time, and as a result, a phase locked loop in the data driver 200 may be prevented from not performing the training operation for a long time.

Figure 8:
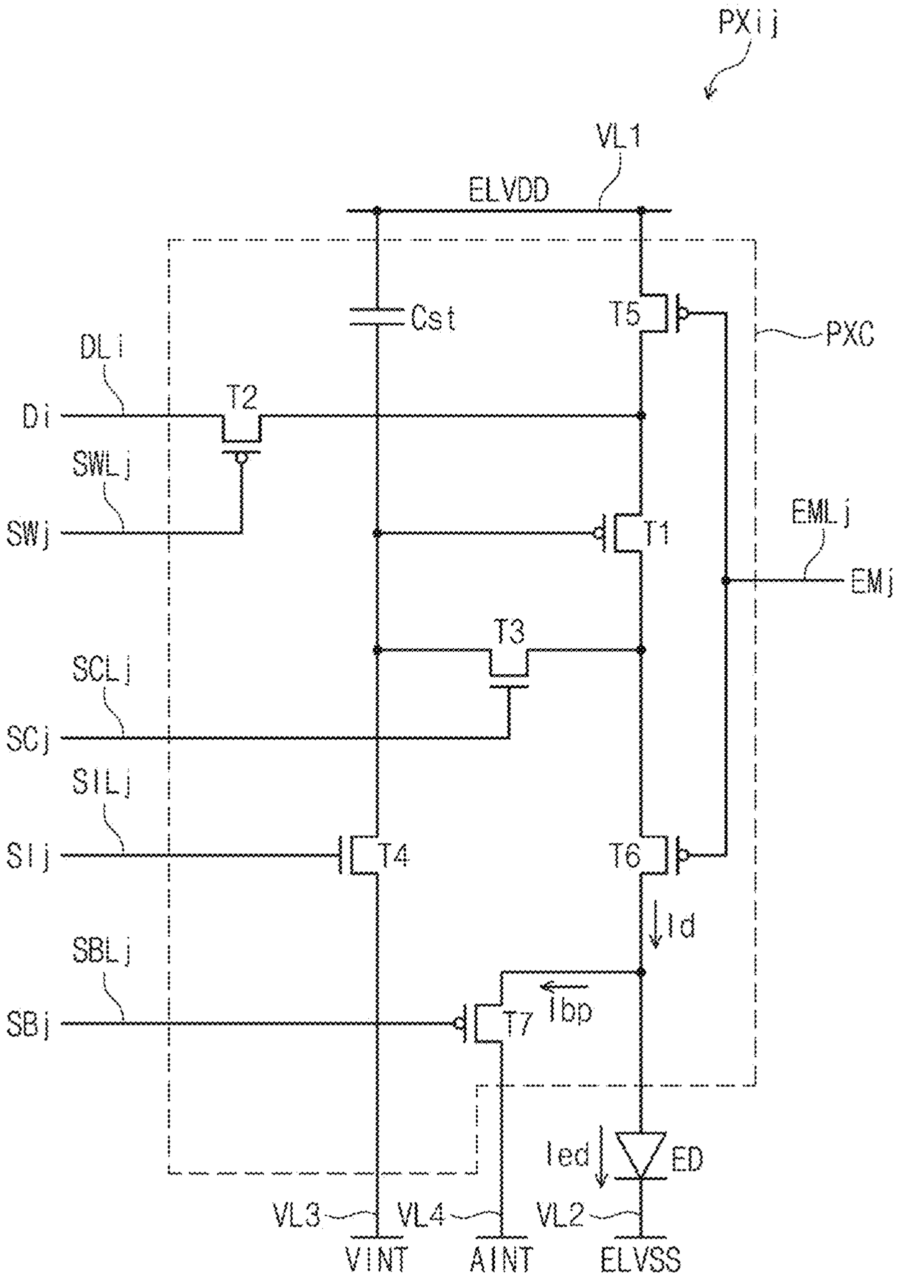
FIG. 8 is a circuit diagram of a pixel according to an embodiment of the present disclosure.
Figure 9:
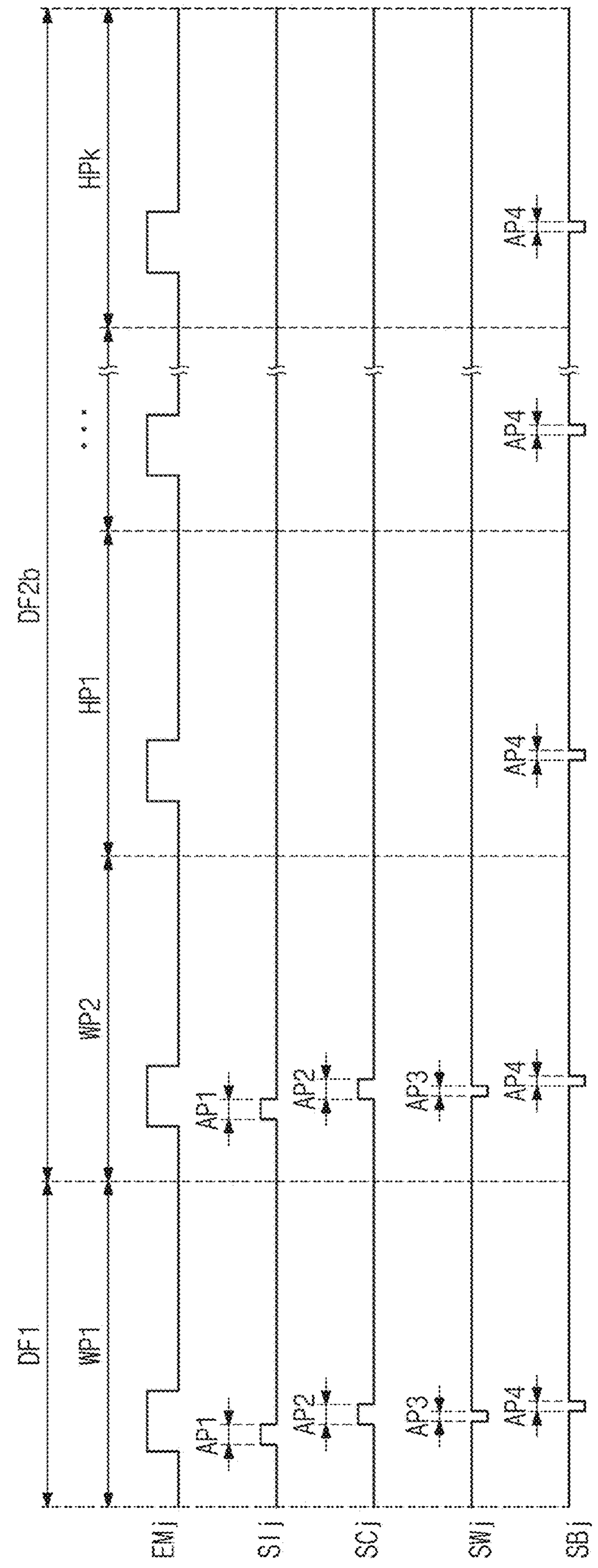
FIG. 9 is a timing diagram of an operation of a pixel in a first driving frame and a second driving frame according to an embodiment of the present disclosure.

FIG. 8 is a circuit diagram of a pixel PXij according to an embodiment of the present disclosure. FIG. 9 is a timing diagram of an operation of the pixel in a first driving frame and a second driving frame according to an embodiment of the present disclosure. FIG. 8 shows an equivalent circuit diagram of one pixel PXij among the pixels shown in FIG. 3 as a representative example. The pixels PX may have the same circuit configuration, and thus, the circuit configuration of the pixel PXij will be described in detail, and details of other pixels will be omitted.

Referring to FIG. 8, the pixel PXij may be connected to an i-th data line DLi (hereinafter, referred to as a data line) among the data lines DL1 to DLm and a j-th light emission control line EMLj (hereinafter, referred to as a light emission control line) among the light emission control lines EML1 to EMLn. The pixel PXij may be connected to aj-th initialization scan line SILj (hereinafter, referred to as an initialization scan line) among the initialization scan lines SIL1 to SILn, aj-th write scan line SWLj (hereinafter, referred to as a write scan line) among the write scan lines SWL1 to SWLn+1, and aj-th black scan line SBLj (hereinafter, referred to as a black scan line). In addition, the pixel PXij may be connected to aj-th compensation scan line SCLj (hereinafter, referred to as a compensation scan line) among the compensation scan lines SCL1 to SCLn. Alternatively, the pixel PXij may be connected to a (j+1)th write scan line instead of the j-th black scan line SBLj.

The pixel PXij may include the light emitting element ED and the pixel circuit part PXC. The light emitting element ED may include a light emitting diode. The light emitting diode may include an organic light emitting material, an inorganic light emitting material, a quantum dot, or a quantum rod as its light emitting layer.

The pixel circuit part PXC may include first, second, third, fourth, fifth, sixth, and seventh transistors T1, T2, T3, T4, T5, T6, and T7 and one capacitor Cst. Each of the first to seventh transistors T1 to T7 may be a transistor including a low-temperature polycrystalline silicon ("LTPS") semiconductor layer. Some transistors of the first to seventh transistors T1 to T7 may be a P-type transistor, and the other transistors may be an N-type transistor. As an example, each of the first, second, fifth, sixth, and seventh transistors T1, T2, T5, T6, and T7 among the first to seventh transistors T1 to T7 may be the P-type transistor, and each of the third and fourth transistors T3 and T4 may be the N-type transistor including an oxide semiconductor as its semiconductor layer. However, the configuration of the pixel circuit part PXC should not be limited to the embodiment shown in FIG. 8. The pixel circuit part PXC shown in FIG. 8 is merely an example, and the configuration of the pixel circuit part PXC may be changed. As an example, all the first to seventh transistors T1 to T7 may be the P-type transistor or the N-type transistor.

The initialization scan line SILj, the compensation scan line SCLj, the write scan line SWLj, the black scan line SBLj, and the light emission control line EMLj may transmit a j-th initialization scan signal SIj (hereinafter, referred to as an initialization scan signal), aj-th compensation scan signal SCj (hereinafter, referred to as a compensation scan signal), a j-th write scan signal SWj (hereinafter, referred to as a write scan signal), a j-th black scan signal SBj (hereinafter, referred to as a black scan signal), and a j-th light emission control signal EMj (hereinafter, referred to as a light emission control signal) to the pixel PXij, respectively. The data line DLi may transmit a data signal Di to the pixel PXij. The data signal Di may have a voltage level corresponding to a grayscale of a corresponding input image signal among the input image signal RGB input to the display device DD (refer to FIG. 1). First, second, third, and fourth driving voltage lines VL1, VL2, VL3, and VL4 may transmit the first driving voltage ELVDD, the second driving voltage ELVSS, the first initialization voltage VINT, and the second initialization voltage AINT to the pixel PXij, respectively.

The first transistor T1 may include a first electrode connected to the first driving voltage line VL1 via the fifth transistor T5, a second electrode electrically connected to an anode of the light emitting element ED via the sixth transistor T6, and a gate electrode connected to one end of the capacitor Cst. The first transistor T1 may receive the data signal Di transmitted via the data line DLi according to a switching operation of the second transistor T2 and may supply a driving current Id to the light emitting element ED.

The second transistor T2 may include a first electrode connected to the data line DLi, a second electrode connected to the first electrode of the first transistor T1, and a gate electrode connected to the write scan line SWLj. The second transistor T2 may be turned on in response to the write scan signal SWj applied thereto via the write scan line SWLj and may transmit the data signal Di applied thereto via the data line DLi to the first electrode of the first transistor T1.

The third transistor T3 may include a first electrode connected to the second electrode of the first transistor T1, a second electrode connected to the gate electrode of the first transistor T1, and a gate electrode connected to the compensation scan line SCLj. The third transistor T3 may be turned on in response to the compensation scan signal SCj applied thereto via the compensation scan line SCLj and may connect the gate electrode and the second electrode of the first transistor T1 to each other to allow the first transistor T1 to be connected in a diode configuration.

The fourth transistor T4 may include a first electrode connected to the gate electrode of the first transistor T1, a second electrode connected to the third driving voltage line VL3 to which the first initialization voltage VINT is transmitted, and a gate electrode connected to the initialization scan line SILj. The fourth transistor T4 may be turned on in response to the initialization scan signal SIj applied thereto via the initialization scan line SILj and may transmit the first initialization voltage VINT to the gate electrode of the first transistor T1 to perform an initialization operation that initializes a voltage of the gate electrode of the first transistor T1.

The fifth transistor T5 may include a first electrode connected to the first driving voltage line VL1, a second electrode connected to the first electrode of the first transistor T1, and a gate electrode connected to the light emission control line EMLj.

The sixth transistor T6 may include a first electrode connected to the second electrode of the first transistor T1, a second electrode connected to the anode of the light emitting element ED, and a gate electrode connected to the light emission control line EMLj.

The fifth transistor T5 and the sixth transistor T6 may be substantially simultaneously turned on in response to the light emission control signal EMj applied thereto via the light emission control line EMLj. The first driving voltage ELVDD applied via the turned-on fifth transistor T5 may be compensated for by the first transistor T1 connected in the diode configuration and may be transmitted to the light emitting element ED.

The seventh transistor T7 may include a first electrode connected to the second electrode of the sixth transistor T6, a second electrode connected to the fourth driving voltage line VL4 to which the second initialization voltage AINT is transmitted, and a gate electrode connected to the black scan line SBLj.

As described above, the one end of the capacitor Cst may be connected to the gate electrode of the first transistor T1, and the other end of the capacitor Cst may be connected to the first driving voltage line VL1. A cathode of the light emitting element ED may be connected to the second driving voltage line VL2 that transmits the second driving voltage ELVSS.

Referring to FIGS. 8 and 9, the display panel DP (refer to FIG. 3) may display the image during the driving frames DF T and DF2*b*. The first driving frame DF1 of the driving frames DFT and DF2*b* may have the reference frequency, and the second driving frame DF2*b* of the driving frames DF T and DF2*b* may have the second frequency lower than the reference frequency. The first driving frame DFT may include the first write period WPT, and the second driving frame DF2*b* may include the second write period WP2 and K holding periods HP1 to HPk. As an example, the reference frequency may be a frequency corresponding to k+1 times of the second frequency, and K may be equal to or greater than 1. In this case, the duration of the second driving frame DF2*b* may correspond to k+1 times of the duration of the first driving frame DF1.

The scan signals SIj, SCj, SWj, and SBj may be activated in the first and second write periods WP1 and WP2. In detail, the initialization scan signal SIj may include a first active period AP1 having a high level in the first and second write periods WP1 and WP2, and the compensation scan signal SCj may include a second active period AP2 having the high level in the first and second write periods WP1 and WP2. The write scan signal SWj may include a third active period AP3 having a low level in the first and second write periods WP1 and WP2, and the black scan signal SBj may include a fourth active period AP4 having a low level in the first and second write periods WP1 and WP2. As an example, the black scan signal SBj may further include the fourth active period AP4 having the low level in the K holding periods HP1 to HPk in addition to the first and second write periods WP1 and WP2. That is, among the scan signals SIj, SCj, SWj, and SBj, some scan signals SIj, SCj, and SWj may have the same frequency as the frequency of corresponding driving frames, and the other scan signal SBj may have the same frequency as the reference frequency.

The light emission control signal EMj may be activated in the first and second write periods WF1 and WP2 and the K holding periods HP1 to HPk. That is, the light emission control signal EMj may have the same frequency as the reference frequency.

When the initialization scan signal SIj having the high level is provided via the initialization scan line SILj during the first active period AP1, the fourth transistor T4 may be turned on in response to the initialization scan signal SIj having the high level. The first initialization voltage VINT may be applied to the gate electrode of the first transistor T1 via the turned-on fourth transistor T4, and the gate electrode of the first transistor T1 may be initialized in response to the first initialization voltage VINT.

Then, when the compensation scan signal SCj having the high level is provided via the compensation scan line SCLj during the second active period AP2, the third transistor T3 may be turned on. During the second active period AP2, the first transistor T1 may be connected in the diode configuration and may be forward biased by the turned-on third transistor T3. The second active period AP2 of the compensation scan signal SCj may not overlap the first active period AP1 of the initialization scan signal SIj. In addition, the first active period AP1 of the initialization scan signal SIj may precede the second active period AP2 of the compensation scan signal SCj.

As an example, the second active period AP2 of the compensation scan signal SCj may be defined as a period in which the compensation scan signal SCj has the high level, and the first active period AP1 of the initialization scan signal SIj may be defined as a period in which the initialization scan signal SIj has the high level. When each of the third and fourth transistors T3 and T4 is the P-type transistor, the second active period AP2 of the compensation scan signal SCj may be defined as a period in which the compensation scan signal SCj has the low level, and the first active period AP1 of the initialization scan signal SIj may be defined as a period in which the initialization scan signal SIj has the low level.

The second active period AP2 may overlap the third active period AP3 in which the write scan signal SWj is generated at a low level. The second transistor T2 may be turned on in response to the write scan signal SWj at a low level during the third active period AP3. Then, a compensation voltage "Di-Vth" that corresponds to a voltage reduced by a threshold voltage Vth of the first transistor T1 from the data signal Di provided via the data line DLi may be applied to the gate electrode of the first transistor T1. That is, an electric potential of the gate electrode of the first transistor T1 may be the compensation voltage "Di−Vth".

The first driving voltage ELVDD and the compensation voltage "Di−Vth" may be applied to opposite ends of the capacitor Cst, respectively, and the capacitor Cst may be charged with electric charges corresponding to a difference in voltage between the opposite ends of the capacitor Cst.

The seventh transistor T7 may be turned on in response to the black write scan signal SBj having the low level applied thereto via the black scan line SBLj. A portion of the driving current Id may be bypassed as a bypass current Ibp via the seventh transistor T7.

In a case where the pixel PXij displays a black image, when the light emitting element ED emits a light even though a minimum driving current of the first transistor T1 flows as the driving current Id, the pixel PXij may not properly display the black image. Therefore, the seventh transistor T7 of the pixel PXij according to the embodiment of the present disclosure may distribute a portion of the minimum driving current of the first transistor T1 to another current path as the bypass current Ibp rather than to a current path to the light emitting element ED. In this case, the minimum driving current of the first transistor T1 means a current flowing to the first transistor T1 under a condition that a gate-source voltage Vgs of the first transistor T1 is less than the threshold voltage Vth and the first transistor T1 is turned off. In this way, when the minimum driving current that turns off the first transistor T1, for example, a current of less than about 10 picoamperes (pA), is transmitted to the light emitting element ED, an image with an abnormal black grayscale may be displayed. In the case where the pixel PXij displays the black image, an influence of the bypass current Ibp on the minimum driving current is relatively large, however, in the case where images, such as a normal image or a white image, are displayed, the influence of the bypass current Ibp on the driving current Id may be negligible. Accordingly, when the black image is displayed, a current, i.e., a light emitting current led, reduced by an amount of the bypass current Ibp, which is bypassed through the seventh transistor T7, from the driving current Id may be provided to the light emitting element ED, and thus, the black image may be clearly displayed. Thus, the pixel PXij may display an accurate black grayscale image using the seventh transistor T7, and as a result, a contrast ratio may be improved.

Then, a level of the light emission control signal EMj provided from the light emission control line EMLj may be changed to a low level from a high level. The fifth transistor T5 and the sixth transistor T6 may be turned on in response to the light emission control signal EMj having the low level. As a result, the driving current Id may be generated due to a difference in voltage between a gate voltage of the gate electrode of the first transistor T1 and the first driving voltage ELVDD, the driving current Id may be supplied to the light emitting element ED via the sixth transistor T6, and thus, the light emitting current led may flow through the light emitting element ED.

During the K holding periods HPI1 to HPk, the light emitting element ED may maintain the current led flowing through the light emitting element ED during the first and second write periods WP1 and WP2, and each of the K holding periods HP1 to HPk may maintain the image displayed during the first and second write periods WP1 and WP2.

Figure 10:
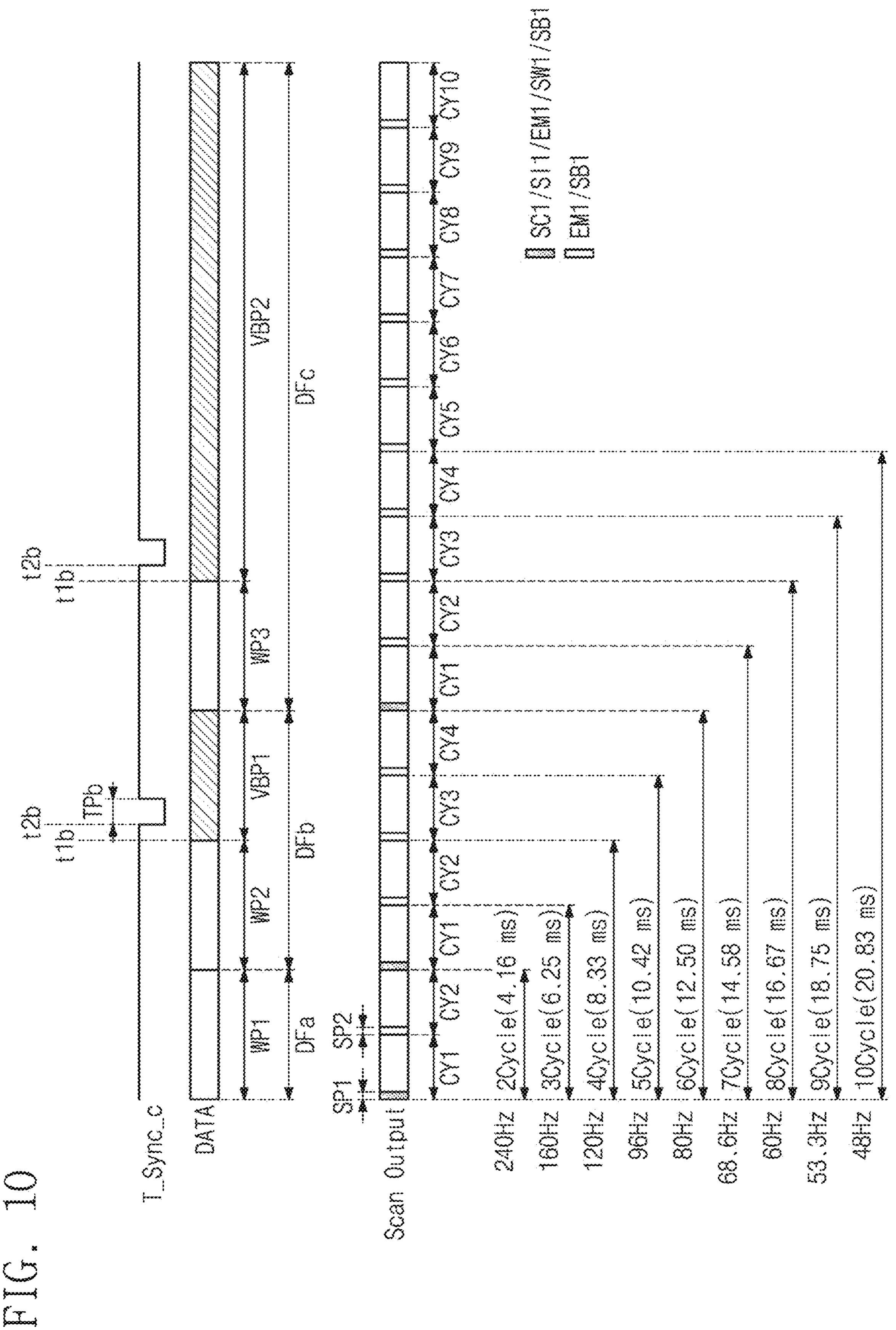
FIG. 10 is a waveform diagram of an output frequency of image data and an output frequency of scan signals according to an embodiment of the present disclosure.

FIG. 10 is a waveform diagram of an output frequency of image data and an output frequency of scan signals according to an embodiment of the present disclosure.

Referring to FIG. 10, each of driving frames DFa, DFb, and DFc may include a write period. The write period may be a period in which the data signal is output from the data driver 200 to display the image. In detail, a first driving frame DFa may include a first write period WP1, a second driving frame DFb may include a second write period WP2, and a third driving frame DFc may include a third write period WP3. Even though the first, second, and third driving frames DFa, DFb, and DFc have different frequencies in the variable frequency mode, the first to third write periods WP1 to WP3 may have the same duration.

Each of the first to third write periods WP1 to WP3 may include a plurality of sub-periods. As an example, each of the first to third write periods WP1 to WP3 may include two sub-periods, i.e., first and second sub-periods CY1 and CY2. Each of the first and second sub-periods CY1 and CY2 may have a duration corresponding to a half (½) of the duration of each of the first to third write periods WP1 to WP3.

The scan signals and the light emission control signal may be activated during the first sub-period CY1, and some of the scan signals and the light emission control signal may be activated in the second sub-period CY2. In this case, a first scan period SP1 of the first sub-period CY1 may be defined as a period in which first scan signals SC1, SI1, SW1, and SB1 and a first light emission control signal EM1 are activated. In detail, a first initialization scan signal SI1, a first compensation scan signal SC1, a first write scan signal SW1, a first black scan signal SB1, and a first light emission control signal EM1 may be activated in the first scan period SP1.

A second scan period SP2 of the second sub-period CY2 may be defined as a period in which some of the scan signals and the first light emission control signal EM1 of the first scan signals are activated. That is, only the first black scan signal SB1 and the first light emission control signal EM1 may be activated in the second scan period SP2.

As an example, in the case where a first frequency among first to third frequencies is set as a reference frequency, the second and third driving frames DFb and DFc each having the frequency lower than the reference frequency may further include a variable blank period. The variable blank period may be a period in which the data signal to display the image is not output from the data driver 200, and a constant voltage, e.g., a bias voltage or a black grayscale voltage, is maintained.

As an example, the second driving frame DFb may further include a first variable blank period VBP1 in addition to the second write period WP2, and the third driving frame DFc may further include a second variable blank period VBP2 in addition to the third write period WP3. In the case where the second and third driving frames DFb and DFc have different frequencies, the first and second variable blank periods VBP1 and VBP2 may have different durations from each other. As an example, in the case where the third driving frame DFc has the frequency lower than the frequency of the second driving frame DFb, the duration of the second variable blank period VBP2 may be greater than the duration of the first variable blank period VBP1. The duration of the variable blank period may vary depending on the frequency.

As an example, the variable blank period may include at least one sub-period. As an example, the first variable blank period VBP1 may include two sub-periods, i.e., third and fourth sub-periods CY3 and CY4, and the second variable blank period VBP2 may include eight sub-periods, i.e., third to tenth sub-periods CY3 to CY10. The number of the sub-periods included in the variable blank period may vary depending on the frequency. As an example, when the driving frame has a frequency of about 160 Hz, the variable blank period may include one sub-period, and when the driving frame has a frequency of about 96 Hz, the variable blank period may include five sub-periods. That is, as the frequency of the driving frame decreases, the number of the sub-periods included in the variable blank period may increase.

Each driving frame may include an integer multiple of the sub-periods. As an example, when the driving frame has a frequency of about 240 Hz, each frame may include two sub-periods, when the driving frame has a frequency of about 120 HZ, each frame may include four sub-periods, and when the driving frame has a frequency of about 80 Hz, the driving frame may include six sub-periods. That is, as the frequency of the driving frame decreases, the number of the sub-periods included in each driving frame may increase.

During the sub-period included in the variable blank period, some of the scan signals and the light emission control signal may be activated. In detail, the first black scan signal SB1 and the first light emission control signal EM1 may be activated during the sub-period included in the variable blank period, however, the first initialization scan signal SIT, the first compensation scan signal SC1, and the first write scan signal SW1 may be maintained in an inactive state.

Referring to FIGS. 5 and 10, each of the first to third write periods WP1 to WP3 may include the N horizontal periods OH1 to OHn. Each of the horizontal periods OH1 to OHn may have a first duration. In this case, each of the first to third write periods WP1 to WP3 may have a second duration corresponding to N times of the first duration, and in particular, the second duration may be substantially the same as N times of the first duration. As an example, the first duration may be greater than a duration of each of the input horizontal periods IH1 to IHn.

As described above, in the case where the second duration of each of the first to third write periods WP1 to WP3 corresponds to N times of the first duration, i.e., when the second duration is substantially the same as the N times of the first duration, the blank period corresponding to the input blank periods IVP1 to IVP3 may be removed from the driving frames DFa, DFb, and DFc. However, the variable blank period may exist in some driving frames DFb and DFc among the driving frames DFa, DFb, and DFc according to the variation of the frequency. In the case where the first frequency is set as the reference frequency, the first driving frame DFa may include only the first write period WP1, however, the second and third driving frames DFb and DFc may include the first and second variable blank periods VBP1 and VBP2, respectively.

As shown in FIGS. 3 and 10, the driving controller 100 may apply a training synchronizing signal T_Sync_c to the data driver 200 during the variable blank periods VBP1 and VBP2. As an example, the training synchronizing signal T_Sync_c may be activated in each of the variable blank periods VBP1 and VBP2. In detail, the training synchronizing signal T_Sync_c may be activated at a second time point t2*b* after a predetermined reference time lapses from a first time point t1*b* at which the variable blank periods VBP1 and VBP2 start. FIG. 10 shows a case where there is a time difference between the first and second time points t1*b* and t2*b* corresponding to the predetermined reference time, however, the present disclosure should not be limited thereto or thereby. Alternatively, the first and second time points t1*b* and t2*b* may substantially coincide with each other. The training synchronizing signal T_Sync_c may be activated for a predetermined period (hereinafter, referred to as a training period TPb) in a first sub-period, i.e., the third sub-period CY3, of each of the variable blank periods VBP1 and VBP2. In this case, a duration of the training period TPb may be smaller than a duration of the third sub-period CY3.

As described above, in the case where the blank period corresponding to the input blank periods IVP1 to IVP3 is removed from the driving frames DFa to DFc, the training synchronizing signal T_Sync_c may be activated in the variable blank periods VBP1 and VBP2, and thus, the phase locked loop of the data driver 200 may periodically perform the training operation.

Although the embodiments of the present disclosure have been described, it is understood that the present disclosure should not be limited to these embodiments but various changes and modifications can be made by one ordinary skilled in the art within the spirit and scope of the present disclosure as hereinafter claimed. Therefore, the disclosed subject matter should not be limited to any single embodiment described herein, and the scope of the present invention shall be determined according to the attached claims.

What is claimed is:

1. A display device comprising:
- a display panel comprising a plurality of pixels; and
- a panel driver, which drives the display panel during a plurality of driving frames of which frequencies are varied, wherein the plurality of driving frames includes a first driving frame having a first frequency and comprising a first write period, and a second driving frame having a second frequency lower than the first frequency and comprising a second write period and a variable blank period, wherein the panel driver comprises:
- a data driver, which outputs data signals; and
- a driving controller, which controls a drive of the data driver, wherein each of the first and second write periods comprises N horizontal periods, each of the N horizontal periods has a first duration, each of the first and second write periods has a second duration corresponding to N times of the first duration, N is an integer number equal to or greater than 1, and the driving controller applies a training synchronizing signal used to train a phase locked loop in the data driver to the data driver during the variable blank period.

2. The display device of claim 1, wherein the training synchronizing signal is activated after a first time point at which the variable blank period starts.

3. The display device of claim 2, wherein the training synchronizing signal is activated at a second time point after a predetermined reference time lapses from the first time point.

4. The display device of claim 2, wherein the driving controller additionally activates the training synchronizing signal at a third time point when a predetermined critical time lapses from the second time point during the variable blank period.

5. The display device of claim 1, wherein an activation period of the training synchronizing signal has a duration smaller than a duration of the variable blank period.

6. The display device of claim 1, wherein the panel driver further comprises a scan driver, which provides a plurality of scan signals to the pixels, the scan signals are provided to the pixels in the first and second write periods, some scan signals among the scan signals are activated in the variable blank period, and remaining scan signals among the scan signals except for the some scan signals are not activated in the variable blank period.

7. The display device of claim 6, wherein the panel driver further comprises a light emission driver, which provides a light emission control signal to the pixels, the light emission control signal is activated in the first and second write periods, and the light emission control signal is activated in the variable blank period.

8. The display device of claim 7, wherein the some scan signals have a frequency higher than a frequency of the remaining scan signals and have a same frequency as the light emission control signal.

9. The display device of claim 1, wherein each of the first and second write periods comprises a plurality of sub-periods, the variable blank period comprises at least one sub-period, each of plurality of sub-periods and the at least one sub-period has a same predetermined duration, and each driving frame has a duration corresponding to an integer multiple of the predetermined duration.

10. A display device comprising:
- a display panel comprising a plurality of pixels; and
- a panel driver, which drives the display panel during a plurality of driving frames of which frequencies are varied, wherein the plurality of driving frames includes a first driving frame having a first frequency and comprising a first write period in which data signals are written in the pixels, and a second driving frame having a second frequency lower than the first frequency and comprising a second write period in which the data signals are written in the pixels and at least one holding period in which the data signals are held, wherein the panel driver comprises:
- a data driver, which outputs the data signals; and
- a driving controller, which controls a drive of the data driver, wherein the driving controller applies a training synchronizing signal used to train a phase locked loop in the data driver to the data driver during the at least one holding period.

11. The display device of claim 10, wherein the second write period has a same duration as a duration of the first write period.

12. The display device of claim 11, wherein each of the first and second write periods comprises N horizontal periods, each of the horizontal periods has a first duration, N is an integer number equal to or greater than 1, and each of the first and second write periods has a second duration corresponding to N times of the first duration.

13. The display device of claim 10, wherein the training synchronizing signal is activated after a first time point at which a variable blank period starts.

14. The display device of claim 13, wherein the training synchronizing signal is activated at a second time point after a predetermined reference time lapses from the first time point.

15. The display device of claim 13, wherein, when the second driving frame comprises a plurality of holding periods, the first time point is a time point at which a first holding period among the holding periods starts.

16. The display device of claim 13, wherein the driving controller additionally activates the training synchronizing signal at a third time point when a predetermined critical time lapses from a second time point during the at least one holding period.

17. The display device of claim 10, wherein an activation period of the training synchronizing signal has a duration smaller than a duration of each of the at least one holding period.

18. The display device of claim 10, wherein the panel driver further comprises a scan driver, which provides a plurality of scan signals to the pixels, the scan signals are provided to the pixels in the first and second write periods, some scan signals among the scan signals are activated in the at least one holding period, and remaining scan signals among the scan signals except for the some scan signals are not activated in the at least one holding period.

19. The display device of claim 18, wherein the panel driver further comprises a light emission driver, which provides a light emission control signal to the pixels, the light emission control signal is activated in the first and second write periods, and the light emission control signal is activated in the at least one holding period.

20. The display device of claim 19, wherein the some scan signals have a frequency higher than a frequency of the remaining scan signals and have a same frequency as the light emission control signal.

* * * * *